United States Patent
Wagner et al.

(10) Patent No.: US 6,640,682 B2
(45) Date of Patent: Nov. 4, 2003

(54) APPARATUS FOR CONTINUOUSLY CUTTING AWAY PIECES FROM A CONTINUOUSLY MOVING ENDLESS MATERIAL

(75) Inventors: Johannes Wagner, Wackernheim (DE); Ruediger Hepp, Mainz (DE); Holger Wegener, Alfeld (DE); Helmut Larm, Alfeld (DE); Dirk Hauer, Ingelheim (DE); Heinz-Georg Geissler, Huenstetten (DE)

(73) Assignee: Schott Spezialglas GmbH, Mainz (DE)

(*) Notice: Subject to any disclaimer, the term of this patent is extended or adjusted under 35 U.S.C. 154(b) by 0 days.

(21) Appl. No.: 10/178,087

(22) Filed: Jun. 24, 2002

(65) Prior Publication Data

US 2002/0166427 A1 Nov. 14, 2002

Related U.S. Application Data

(62) Division of application No. 09/754,163, filed on Jan. 4, 2001.

(30) Foreign Application Priority Data

Jan. 7, 2000 (DE) .......................................... 100 00 469

(51) Int. Cl.[7] .............................................. B23D 25/00
(52) U.S. Cl. .............................. 83/289; 83/295; 83/365; 83/371
(58) Field of Search ........................... 83/37, 353, 371, 83/284–349, 295, 286, 365, 289

(56) References Cited

U.S. PATENT DOCUMENTS

| | | | | |
|---|---|---|---|---|
| 3,310,855 A | * | 3/1967 | Orioli ............................ | 83/295 |
| 3,424,357 A | * | 1/1969 | Curtze et al. .................. | 83/402 |
| 3,628,450 A | * | 12/1971 | Schmidt ......................... | 83/38 |
| 3,703,115 A | * | 11/1972 | Nagae et al. .................. | 83/886 |
| 3,785,229 A | * | 1/1974 | Halberschmidt et al. ...... | 83/879 |
| 3,797,339 A | * | 3/1974 | Pape et al. ..................... | 83/886 |
| 3,802,306 A | * | 4/1974 | Brown et al. .................. | 83/886 |
| 3,807,261 A | * | 4/1974 | Couvreur ....................... | 83/879 |
| 4,467,168 A | * | 8/1984 | Morgan et al. ........ | 219/121.67 |
| 4,541,317 A | * | 9/1985 | Van Humbeeck et al. .... | 83/364 |
| 4,549,453 A | * | 10/1985 | Yazaki et al. .................. | 83/365 |
| 4,677,341 A | * | 6/1987 | Kinoshita et al. .......... | 315/12.1 |
| 4,976,573 A | * | 12/1990 | Seki et al. ...................... | 83/869 |
| 5,139,338 A | * | 8/1992 | Pomerantz et al. ......... | 356/601 |
| 5,241,483 A | * | 8/1993 | Porret et al. ................... | 83/371 |
| 5,483,729 A | * | 1/1996 | Fayard .......................... | 83/349 |
| 5,790,257 A | * | 8/1998 | Kim .............................. | 356/401 |
| 6,202,524 B1 | * | 3/2001 | Cunningham ................... | 83/13 |
| 6,236,475 B1 | * | 5/2001 | Kihara et al. .................. | 359/23 |
| 6,260,456 B1 | * | 7/2001 | Schaede ......................... | 83/34 |
| 6,422,283 B1 | * | 7/2002 | Okushita et al. ............. | 156/521 |
| 6,520,057 B1 | * | 2/2003 | Steadman ...................... | 83/365 |
| 6,546,833 B1 | * | 4/2003 | Gifford et al. ................. | 83/371 |

* cited by examiner

*Primary Examiner*—Allan N. Shoap
*Assistant Examiner*—Jason Prone
(74) *Attorney, Agent, or Firm*—Michael J. Striker

(57) ABSTRACT

To shorten the processing time in modern plants for cutting away pieces or sections from a continuously moving endless material, e.g. a glass strip, one after the other by flying cutting the cutting bridge carrying the cutting device (6) is accelerated until at a speed within a predetermined tolerance range of the feed speed of the continuously running endless material. Then the cutting bridge speed is synchronized for each piece or section to be cutaway and the cutting away of each piece or section takes place after the synchronization. To attain a very high precision cutting the spacing of the front cut edge formed when the previous piece or section is cut away from the cutting device is measured by means of an image-taking device (7) prior to cutting away of the next piece or section. Then the measured spacing is compared with a set value for the spacing and the speed of the cutting bridge is synchronized or fine tuned according to the comparison prior to cutting away the next piece or section.

9 Claims, 6 Drawing Sheets

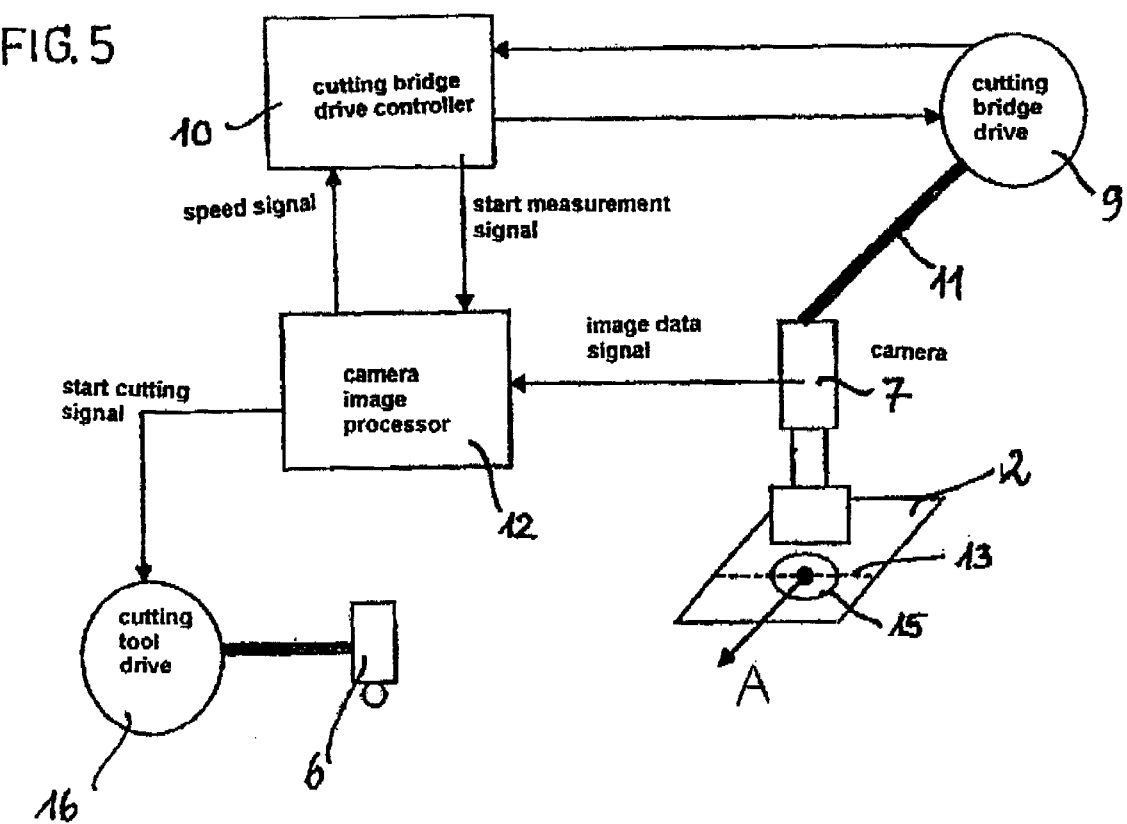

APPARATUS FOR CONTINUOUSLY CUTTING AWAY PIECES FROM A CONTINUOUSLY MOVING ENDLESS MATERIAL

This is a divisional of application Ser. No. 09/754,163, filed Jan. 4, 2001.

BACKGROUND OF THE INVENTION

1. Field of the Invention

The present invention relates to a method for continuously cutting off successive pieces or sections from a continuously moving endless material by flying cutting by means of a cutting apparatus or device accelerated to the speed of the endless material, which is synchronized for each piece or section. It also relates to a cutting apparatus for performing the method.

2. Prior Art

Products in various industrial fields are often available initially in the form of continuously moving endless material, typically as a band or strip. These fields include e.g. flat glass manufacture, steel, aluminum or other metal production or processing fields, certain parts of the plastic industry (for example foil manufacture) and areas of the food industry. In each application the continuously moving band or strip must be cut into predetermined lengths, pieces or sections. The line of the cutting is generally perpendicular to the motion direction of the endless material, i.e. the belt or strip edge.

In order to avoid interruption of the continuous motion of the endless material and so that processing time is not increased, the cutting away of the pieces or sections is performed in a known manner according to the principle of "flying sawing". According to the principle of "flying sawing" a portal or frame, in which a cross-cut slot is provided with a cutting tool, the so-called cutting bridge, is accelerated to the speed of the endless material. As soon as the speed of the endless material is reached, cross-cutting is initiated. Thus the endless material is cut so as to form a rectangular piece or section of the endless material. Subsequently the bridge is moved back into its initial position.

The adjustment of the speed of the cutting bridge to the speed of the endless material occurs typically by means of a controller. The controller establishes a certain predetermined set speed (V-set) for the drive system of the cutting bridge. The controller must also set the exact time point at which the synchronous motion is started. A difference between the actual speed (V-act) and the set speed (V-set) of the cutting bridge or an inexact starting time for the cutting causes inaccurate cutting. The cutting speed of the cutting bridge is the greatest source of factors interfering with the accurate cutting away of the pieces or sections from the endless material.

SUMMARY OF THE INVENTION

It is an object of the present invention to provide an improved method for cutting away successive pieces or sections from a continuously moving endless material of the above-described type, which cuts the pieces or sections with an accuracy in the 1/100 mm range.

It is also an object of the present invention to provide an improved cutting apparatus for performing the improved method according to the invention.

The method according to the invention for continuously cutting away successive pieces or sections from a continuously moving endless material by flying cutting by means of a traveling cutting device accelerated to the speed of the endless material, which is synchronized for each piece or section, comprises the steps of:

a) producing a pre-control speed value for pre-controlling a cutting device travel speed to bring it within a synchronization range of a feed speed of the continuously moving endless material;

b) pre-controlling the cutting device travel speed according to the pre-control speed value until it is within the synchronization range; and c) then generating a control signal for fine regulation of the cutting device travel speed; and d) controlling the cutting device travel speed by means of a cutting device travel speed controller according to the control signal for fine regulation so that each piece or section is cut to a predetermined piece or section length;

wherein the actual value of a distance of the front cut edge of the endless material from which a previous piece or section was cut to the cutting device is measured, a set value of the distance corresponding to the predetermined length of the next piece or section to be cutaway is compared with this actual value and the difference between the set value and the actual value is calculated, the speed of the traveling cutting device within the synchronization range is then fine-tuned or controlled by increasing it or decreasing it by means of the speed controller according to the comparing when there is a difference and the next piece or section is cut away when the set value agrees with the actual value.

The above-described objects of the invention are also attained in an apparatus according to the invention that includes a conventional traveling cutting bridge, which has an elongated carriage that travels in the motion direction of the endless material and a transversely traveling carriage with a cutting tool that is mounted on the elongated carriage, which are accelerated for flying cutting by drive means and are synchronized to the feed speed of the continuously moving endless material.

According to the invention the apparatus has a camera device mounted on the cutting bridge at a predetermined distance from the cutting tool, which corresponds to a length of the next piece or section to be cut away, and control means for the drive means are provided. The control means comprises means for analyzing image signal produced by the camera device and for producing control signals for the drive means for controlling the acceleration of the cutting bridge according to the analysis of the image signals.

The principal features of the invention are that the speed of the cutting device is brought within a synchronization range of the speed of the endless material and after that the speed of the cutting device is fine-tuned or adjusted according to the length of the given piece or section. Because of these features the accuracy of the cut piece or section is within 1/100 mm.

According to a preferred embodiment of the inventive method both the distance of the front cut edge from the cutting tool is measured and the subsequent fine control of the speed synchronization are also performed during the cutting of the endless material. After the cutting is complete they are interrupted or halted until activation or initiation of a following cutting process. Because of this feature a high precision of the cutting process is also maintained during the cutting of the endless material.

The control expense and effort can be limited according to a preferred embodiment of the method according to the invention when the distance of the front cut edge from the cutting tool is measured and the subsequent fine control of the speed synchronization are started as soon as the cutting device is within the tolerance range for the cutting to be performed.

An especially simple control of the cutting away process can be obtained according to a preferred embodiment of the invention by a position control, in which the front cut edge of the endless material is imaged on a camera device moving with the cutting device, the measured position of the image of the cut edge is compared with a position set value and the speed of the cutting device to be synchronized is subsequently controlled according to a deviation of the measured position from the position set value and the cutting away is initiated or started when the measured position agrees with or corresponds to the position set value.

In order to provide a rapid fine control, it is performed digitally and iteratively in successive steps according to a preferred embodiment of the invention. Also an analog control is conceivable.

According to another embodiment the apparatus according to the invention is formed so that the camera device is a high-speed-partial-scan camera and the controller is a digital controller, in which associated image analysis software is provided. This sort of arrangement guarantees the necessary rapid detection of the front edge of the continuously moving endless material and the rapid fine control.

An analog controller can also be employed.

According to another embodiment of the apparatus a camera device comprising a camera with integrated processor is provided. In this case the external image processing software and associated processor can be dispensed with.

An especially fine control is possible when the camera device is a streaking camera with connected comparing device in an alternative embodiment of the apparatus according to the invention.

In a further embodiment of the apparatus according to the invention an illuminating device is arranged on the cutting bridge to provide better optical detection of the front cut edge of the endless material. The illuminating device illuminates the view field of the camera device.

BRIEF DESCRIPTION OF THE DRAWING

The objects, features and advantages of the invention will now be illustrated in more detail with the aid of the following description of the preferred embodiments, with reference to the accompanying figures in which:

FIG. 5 is a schematic block diagram of an apparatus for performing the method illustrated in the flow charts of FIGS. 3 and 4.

DESCRIPTION OF THE PREFERRED EMBODIMENTS

Figure 1:
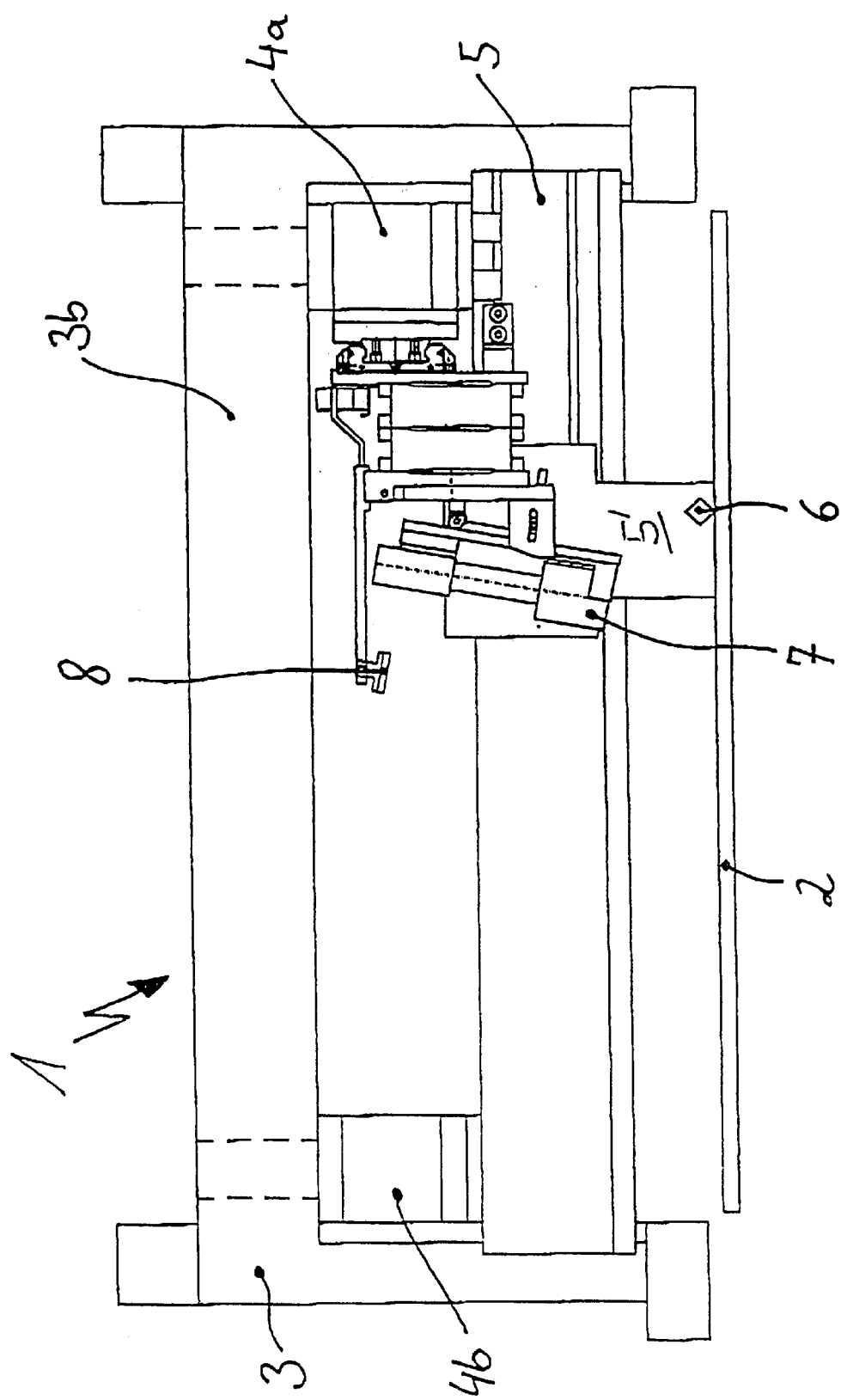
FIG. 1 is a front plan view of a cutting bridge according to the invention for flying cutting of pieces or sections from a continuously moving endless material.
Figure 2:
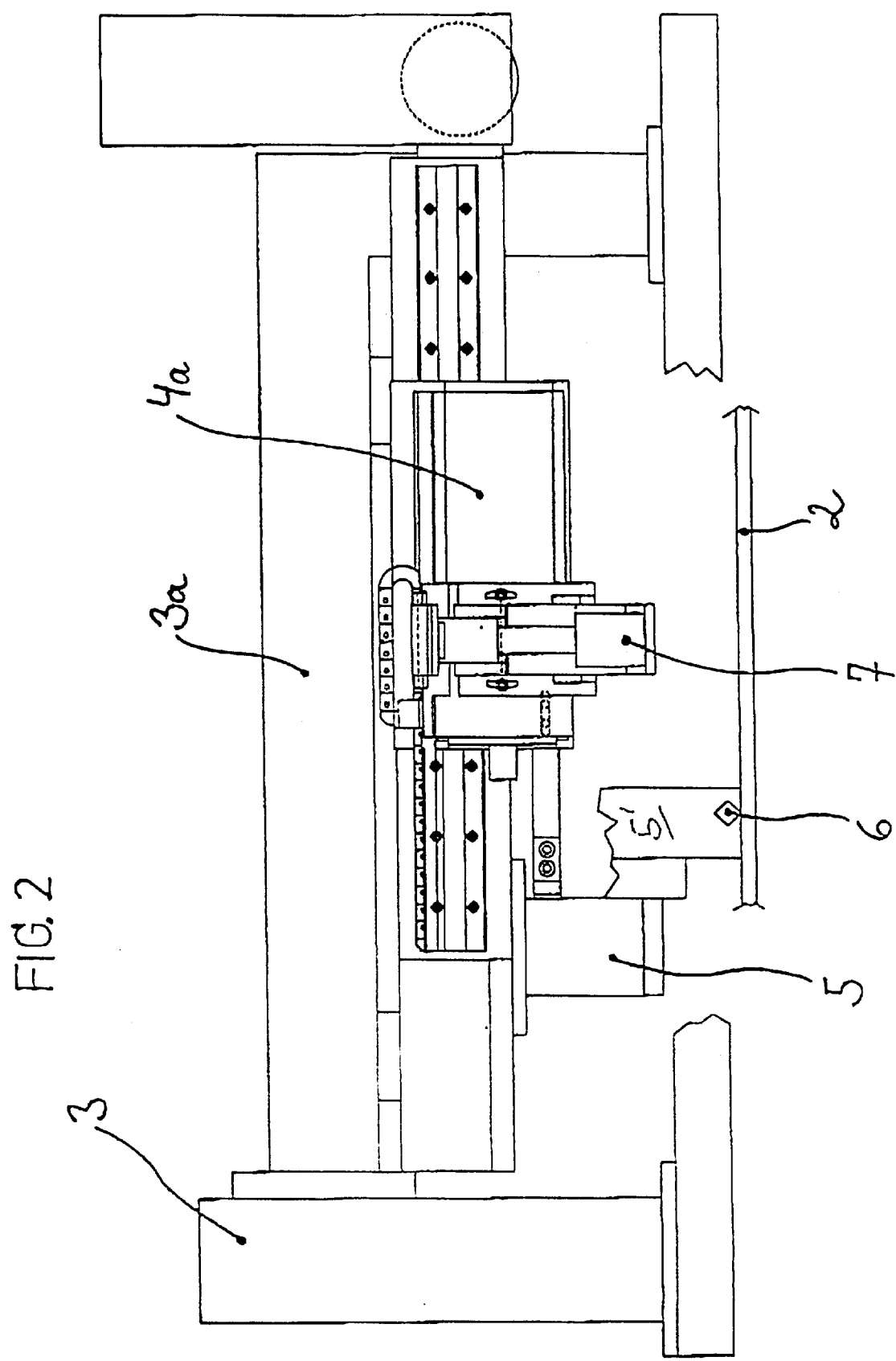
FIG. 2 is a side view of the cutting bridge shown in FIG. 1.

FIGS. 1 and 2 show a cutting bridge 1 for continuously cutting away pieces or sections from a continuously moving endless material by cracking or scoring the material. The continuously moving endless material is a glass strip 2. The glass strip moves out from the drawing plane in the front view of the cutting bridge shown in FIG. 1. The piece or section can be broken off mechanically along the score line. The "scoring" performed in this "score-break-method" in the embodiment described here is part of the "cutting" according to the present invention.

The cutting bridge has stationary portals 3, which are connected with each other by means of longitudinal supports 3a and cross members 3b. An elongated carriage comprising carriage parts 4a and 4b is movable longitudinally, i.e. in the motion direction of the glass strip 2, along the longitudinal supports 3a. The elongated carriage parts 4a and 4b are connected with each other by a transverse support 5. A transversely traveling carriage 5' is mounted on the transverse support 5 extending perpendicular to the motion direction of the glass strip 2, i.e. in the scoring direction. This traveling carriage 5' carries a scoring or cutting tool 6 for scoring the glass strip 2 at a predetermined cutting or score line. The desired section or piece is obtained by breaking it off at the predetermined score line. The cutting bridge has a suitable drive system, preferably a three-phase alternating current servo-drive or linear drive for moving it in the direction of motion of the glass strip 2.

The cutting bridge is itself known and is thus not described in further detail here. It operates in a known way so that during motion of the glass strip 2 the cutting tool 6 is accelerated to the speed of the glass strip from its initial position for cutting each section or piece. Also it is synchronized to the speed of the glass strip before the glass strip is scored or cut. The synchronization of the speeds of the cutting tool and the moving endless material is maintained during the scoring, i.e. during the cutting away of the section or piece. The cutting bridge moves back into its initial position after each scoring or cutting event.

According to the invention an image-taking device 7 is fixed or attached to the cutting bridge. However its position is adjustable and of course so that its spacing in the motion direction of the glass strip 2 from the cutting tool 6 corresponds to the length of the section or piece being cut from the endless material. This image-taking device 7 is thus moved at the synchronized speed. The image-taking device 7 detects or images the score last made during the scoring and breaking process, or the cut edge when the glass strip is cut through e.g. by means of a laser beam, when the next piece or section is in the set range. The image-taking device 7 has a window defined by set marks, which corresponds to the position of the imaged edge or score, when the distance between it and the cutting or scoring tool corresponds exactly to the length of the desired section or piece.

Figure 3:
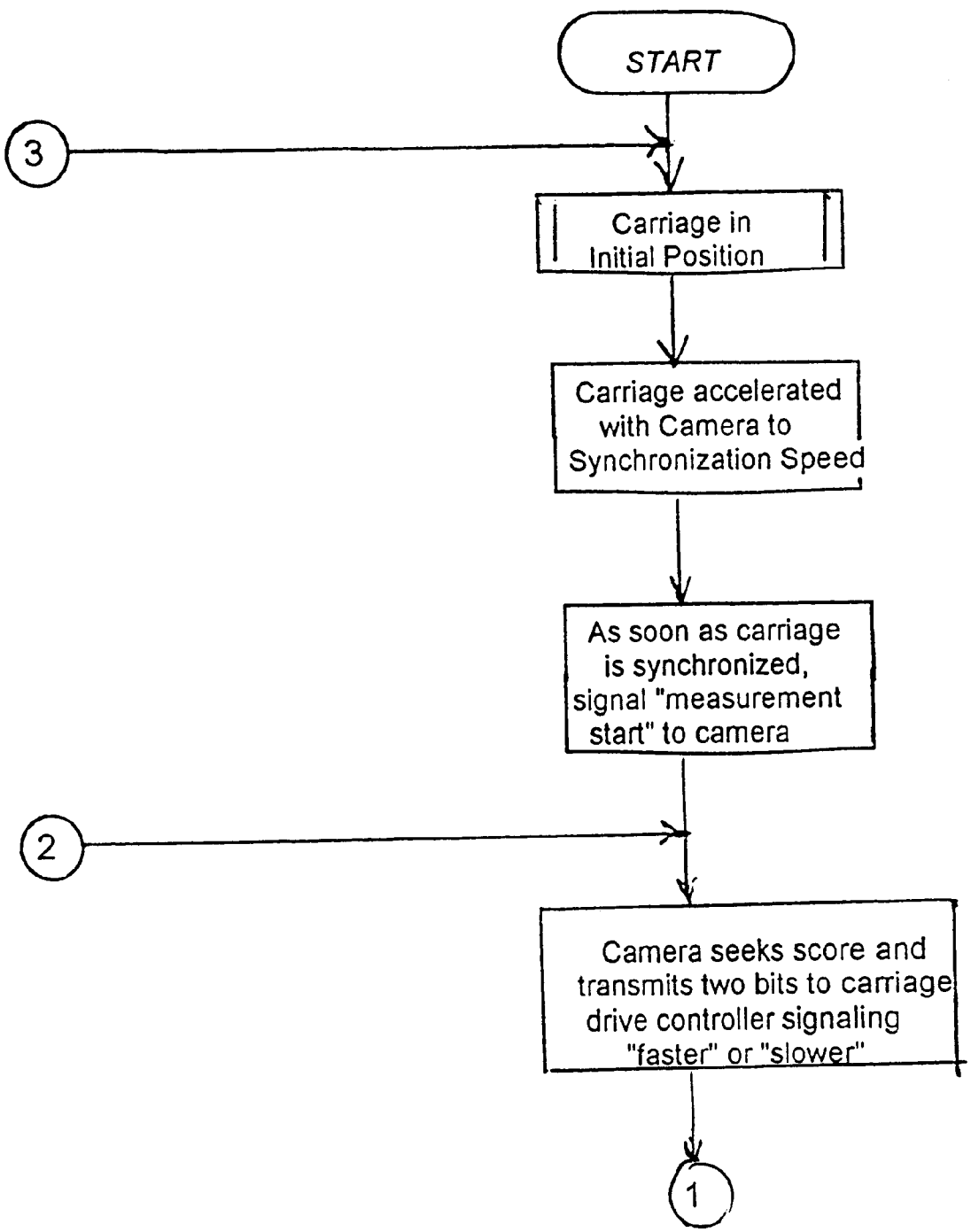
FIGS. 3 and 4 are respective flow charts showing complementary parts of a method for flying cutting away of sections or pieces from the continuously moving endless material according to the invention including fine adjustment for accurate cutting the sections or pieces to length.
Figure 4:
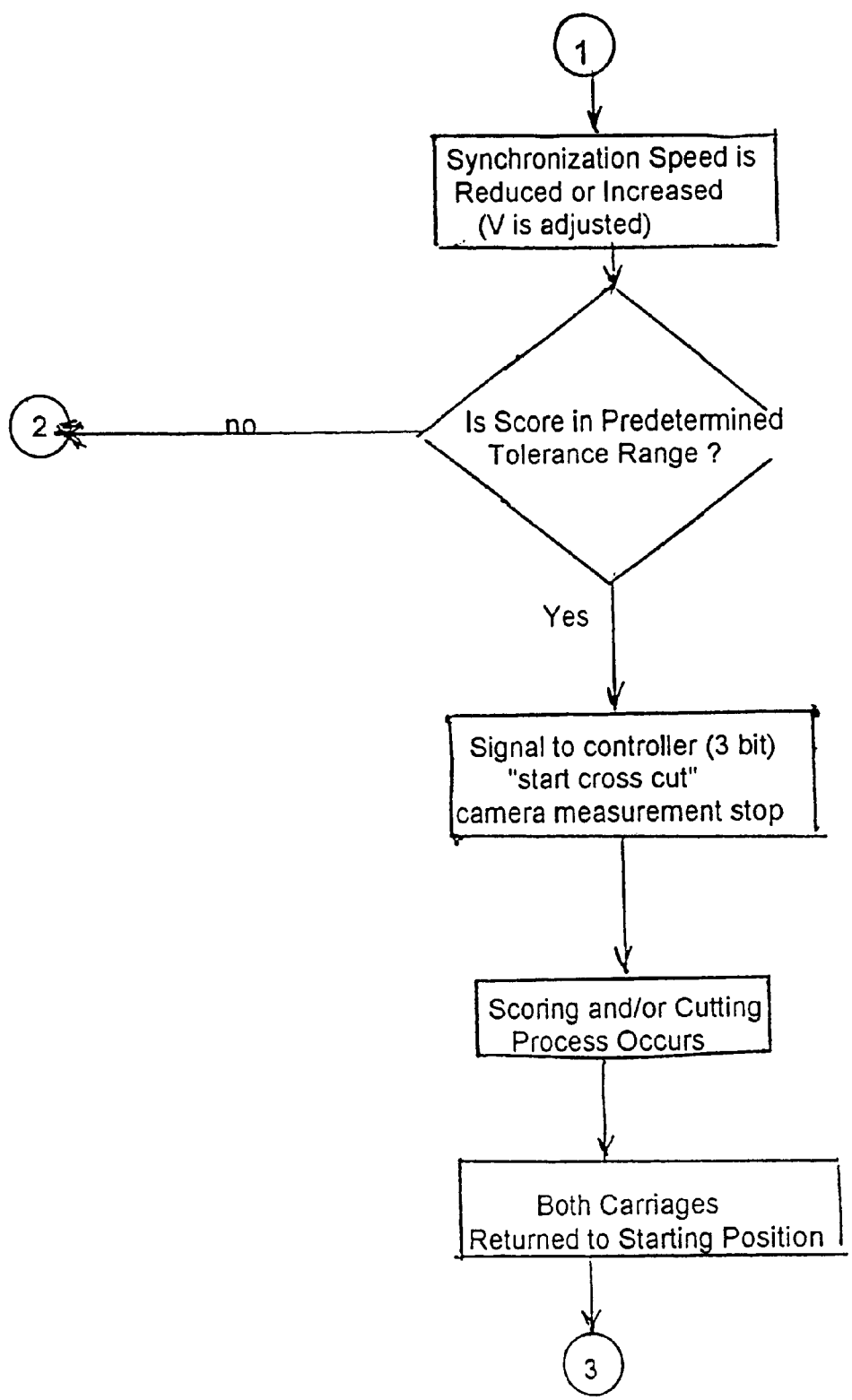

The image-taking device 7, preferably a high-speed partial-scan camera or also a COD-surface camera, is employed together with a digital controller and associated image processing software according to the method set forth in the flow chart in FIGS. 3 and 4. The images from the camera are analyzed by means of the image processing software. The image processing software then produces a "faster" or "slower" signal as a guiding parameter or control signal that is input to the servo-drive of the longitudinal carriage according to whether the image of the cut edge or score is one side or the other of the window. An analog controller produces a suitable "faster" or "slower" control signal accordingly. Because of that the drive accelerates or brakes the cutting bridge. This offset speed can be parameterized. After that a camera image is received or evaluated and the speed of the cutting bridge is correspondingly corrected if necessary. The controller corrects the speed during the synchronization of the current bridge until the controller or the image processing software signals that the out edge or the score is in the predefined window. This sort of control process typically lasts only a few fractions of a second.

The above-described signal serves as a start signal for the three-phase alternating current drive of the transversely traveling carriage 5' for initiating the transverse cutting by the cutting tool 6. During the scoring or cutting the set position is further controlled. Optionally the camera device does not travel in the transverse cutting direction, but only in the direction of motion of the glass strip.

After the end of the scoring or cutting the control is halted and the cutting bridge travels with both carriages back into the initial position.

FIG. 5 shows a block diagram of the apparatus for performing the method according to the flow charts shown in FIGS. 3 and 4, including the essential parts of the apparatus, as well as a description of how the parts cooperate.

The block 9 represents the drive means for the elongated carriage 4a, 4b. The drive means 9 is connected with a drive controller 10. This drive controller 10 supplies the set value for the speed to the drive means 9 and obtains the actual value of the drive speed from it.

The drive means 9 for the elongated carriage 4a, 4b is coupled by means of a camera drive system 11, e.g. a spindle, with an image-forming means, i.e. with the camera device 7. The output signals of the camera, including the image data, are fed to a camera controller 12, which analyze these data. The camera device 7 is accelerated by the drive means 9 for the elongated carriage, until moving synchronously with the motion of the glass strip 2. As soon as the motion is synchronized, the drive controller 10 gives the "start measurement" signal to the camera controller 12.

The camera controller 12 analyzes the image data from the camera device 7. It determines the relationship of the cutting track 13 at the front cut edge of the endless material to a reference mark 14 given by the tolerance range 14. This process is illustrated in the detailed views of the camera image field 15 shown in FIGS. 6a, 6b, and 6c (from the section A taken from FIG. 5). The camera controller 12 sends control signals for changing the speed of the elongated carriage in the drive controller 10 depending on the relative position of the cutting track 13 on the glass strip 2 and the reference mark 14. The drive controller 10 moves the elongated carriage faster or slower in the motion direction of the glass strip according to the measured deviation of the cutting track 13 from the reference mark 14. The drive controller 10 guides the drive means 9 for the elongated carriage with the aid of this speed input.

Figure 6A:
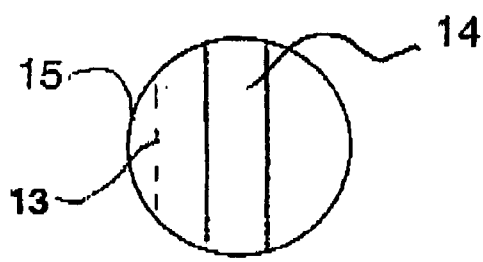
FIGS. 6A, 6B and 6C are respective plan views of a camera field showing successive relative positions of the cutting track on the endless material during a cutting process according to the invention.
Figure 6B:
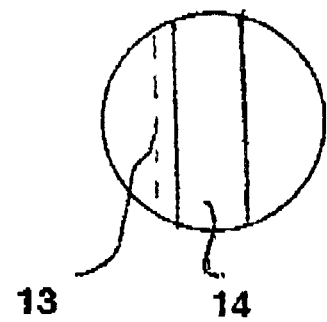
Figure 6C:
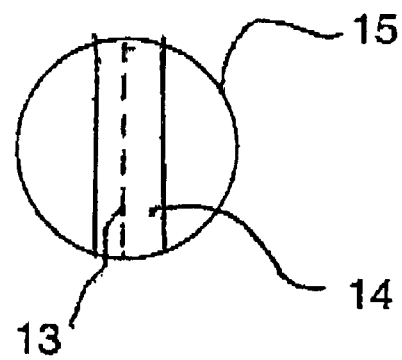

The detailed successive views of the camera field 15 illustrated in FIGS. 6A, 6B and 6C show the relative position of the cutting track 13 at three successive time points respectively. At time point t1 the cutting track 13 is located outside of the tolerance range forming the reference mark 14 as shown in FIG. 6A. The camera speed is then changed (slower or faster) so that the cutting track 13 approaches ever more closely to the reference mark 14 (at time point t2), as shown in FIG. 6B, until at the time point t3 it is located within the tolerance range of the reference mark 14 as shown in FIG. 6C. The camera controller 12 feeds the "start cutting" signal to the drive means 16 for the transversely traveling carriage 5' for the cutting tool 6.

An illuminating device 8 that illuminates the camera view field (FIG. 1) is mounted on the cutting bridge for improved detection of the scoring track or the cut edge. In the case of the above-named camera types the illuminating device 8 is preferably a LED, which emits light in the red spectral region. However other illuminating devices, such as e.g. "cold light", are conceivable. Other arbitrary camera types can be used instead of the above-described CCD area camera.

Known cameras with integrated processors that are programmable can also be used. If these known cameras are employed, it is not necessary to provide a separate processor and image-processing software.

The fastest detection of the actual position of the front cut edge is possible with a streaking camera with hardware in the form of a connected comparator and with an appropriately fast drive controller for the elongated carriage and the transversely traveling carriage.

Besides the advantages already described above the existing cutting bridge can be equipped without further effort with the apparatus according to the invention. This feature expands the applicability of the present invention.

Generally the present invention is applicable to any endless material from which sections or pieces must be continuously cut off.

The disclosure in German Patent Application 100 00 469.5-45 of Jan. 7, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an apparatus and method for continuously cutting off pieces from a continuously moving endless material by flying cutting during motion of the endless material, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An apparatus for continuously cutting away successive pieces or sections from a continuously moving endless material by flying cutting, said continuously moving endless material moving at a predetermined feed speed and said flying cutting being performed by means of a traveling cutting device accelerated to said predetermined feed speed and synchronized with each of said pieces or sections to be cut away from the endless material, said apparatus (1) comprising an elongated carriage (4a, 4b) mounted so as to travel in a motion direction of the continuously moving endless material;

drive means (9) for moving said elongated carriage (4a, 4b) in said motion direction of the continuously moving endless material;

a transversely traveling carriage (5') mounted on said elongated carriage so as to be movable transverse to said motion direction of the continuously moving endless material;

a cutting tool (6) mounted on said traveling carriage (5') for cutting away said pieces or sections, said traveling cutting device comprising said cutting tool (6);

drive means (16) for operating said traveling cutting device to cut away said pieces or sections from said endless material with said cutting tool (6) when a travel speed of said traveling carriage (5') with said cutting tool (6) mounted thereon is synchronized with said predetermined feed speed of the continuously moving endless material;

a camera device (7) mounted in a fixed relationship with said cutting tool (6) and arranged at a predetermined distance from said cutting tool (6), said predetermined distance being substantially equal to a predetermined length of each of said pieces or sections to be cut away, said camera device (7) comprising means for generating image signals of an image of a front out edge of said continuously moving endless material during said flying cutting; and a controller (10) for controlling said drive means (9) for moving said elongated carriage (4a, 4b) according to said image signals from said camera device (7);

wherein said controller (10) includes means for electronically generating a pre-control speed value signal for bringing said travel speed of said traveling carriage within a synchronization range in order to synchronize said travel speed with said predetermined feed speed of said continuously moving endless material;

means for electronically controlling the travel speed of the traveling carriage carrying said cutting tool (6), when said travel speed is within said synchronization range, according to an automatic electronic control signal so that each of said pieces or sections is cut to said predetermined length; and means for activating said drive means (16) for operating said traveling cutting device to cut away said pieces or sections from said endless material with said cutting tool (6) when said travel speed is synchronized with said predetermined feed speed of the continuously moving endless material and when said predetermined length corresponds to said predetermined distance.

2. The apparatus as defined in claim 1, wherein said means for said electronically controlling said travel speed includes means for evaluating said image signals from said camera device to determine whether or not a cutting track (13) at said front cut edge of said continuously moving endless material is located within a reference mark (14) in a camera field (15) of said camera device, said reference mark (14) corresponding to a tolerance range for said predetermined length of each of said pieces or sections to be cut away.

3. The apparatus as defined in claim 2, wherein said means for said electronically control said travel speed generates said automatic electronic control signal and operates digitally and iteratively so that said drive means (9) for moving said elongated carriage is controlled to correct a deviation of said cutting track from said tolerance range.

4. The apparatus as defined in claim 1, further comprising longitudinal supports (3a) arranged on opposite longitudinal sides of the continuously moving endless material and cross members (3b) connecting said longitudinal supports and wherein said elongated carriage (4a, 4b) is mounted on said longitudinal supports (3a) and said cross members (3b) so as to be movable in said motion direction of said continuously moving endless material.

5. The apparatus as defined in claim 1, wherein said camera device (7) comprises a high-speed partial-scan camera, said controller (10) is a digital control device containing an image-analysis software program and said means for evaluating said image signals from said camera device comprises said image-analysis software program.

6. The apparatus as defined in claim 1, wherein said camera device (7) includes a processor integrated therein.

7. The apparatus as defined in claim 1, wherein said camera device (7) comprises a streaking camera with connected comparator.

8. The apparatus as defined in claim 1, further comprising an illumination device for illuminating a view field of the camera device (7).

9. The apparatus as defined in claim 1, wherein said endless material is a glass strip, said cutting tool (6) comprises a laser for cutting said glass strip and said pieces or sections that are cut from said glass strip have respective lengths that are within $\frac{1}{100}$ mm of each other.

* * * * *